US005498277A

United States Patent [19]

Floyd et al.

[11] Patent Number: 5,498,277

[45] Date of Patent: Mar. 12, 1996

[54] PROCESS FOR PRODUCTION OF IRON

[75] Inventors: John M. Floyd, Upper Beaconsfield; Ian L. Chard, Cranbourne; Brian R. Baldock, Skye, all of Australia

[73] Assignee: Ausmelt Limited, Victoria, Australia

[21] Appl. No.: 199,121

[22] PCT Filed: Sep. 17, 1992

[86] PCT No.: PCT/AU92/00489

§ 371 Date: Apr. 19, 1994

§ 102(e) Date: Apr. 19, 1992

[87] PCT Pub. No.: WO93/06251

PCT Pub. Date: Apr. 1, 1993

[30] Foreign Application Priority Data

Sep. 20, 1991 [AU] Australia .................................. PK8456

[51] Int. Cl.$^6$ .................................................. C21B 11/08

[52] U.S. Cl. .................................. 75/385; 75/501; 75/957; 75/961; 75/962

[58] Field of Search ............................. 75/500, 501, 502, 75/385, 957, 961, 962

[56] References Cited

U.S. PATENT DOCUMENTS

| | | | |
|---|---|---|---|
| 4,238,226 | 12/1980 | Sanzenbacher et al. . | |
| 4,522,650 | 6/1985 | Nakajima et al. . | |
| 4,940,488 | 7/1990 | Maeda et al. | 75/500 |
| 5,000,784 | 3/1991 | Takahashi et al. | 75/501 |

FOREIGN PATENT DOCUMENTS

| | | |
|---|---|---|
| 520351 | 1/1982 | Australia . |
| 0040285 | 11/1981 | European Pat. Off. . |
| 0079182 | 5/1983 | European Pat. Off. . |
| 0308925 | 3/1989 | European Pat. Off. . |
| 0319966 | 6/1989 | European Pat. Off. . |
| 2293494 | 7/1976 | France . |
| 3418085 | 11/1985 | Germany . |
| 61-084311 | 4/1986 | Japan . |
| 62-116712 | 5/1987 | Japan . |
| 63-28811 | 2/1988 | Japan . |
| 63-79906 | 4/1988 | Japan . |
| 74568 | 9/1977 | Luxembourg . |
| 656614 | 8/1950 | United Kingdom . |
| 1243443 | 8/1971 | United Kingdom . |
| WO91/05214 | 4/1991 | WIPO . |

*Primary Examiner*—Melvyn Andrews
*Attorney, Agent, or Firm*—Oliff & Berridge

[57] ABSTRACT

A process for smelting iron-containing source material in a reactor containing a slag bath, includes generating heating and reducing conditions in at least one reducing region of the bath by injection of fuel/reductant and oxygen-containing gas by at least one top submerged lance. The source material is fed to the reactor together with additional reductant and with flux at or adjacent the at least one reducing region so as to be subjected to smelting reduction, using coal as the additional reductant. The rates of injection of oxygen and fuel/reductant are controlled to achieve required and sufficient reducing conditions by providing the injected gas with an oxygen content from about 40% to about 100% sufficient for a degree of combustion of the fuel/reductant of from about 40% to about 50%. The CO and $H_2$ generated by the smelting operation, as well as carbon dust carried out of the bath by combustion gases, are subjected to post-combustion in the reactor, enabling efficient heating of the bath while preventing re-oxidization of the bath contents.

31 Claims, 2 Drawing Sheets

16 30 30 38 32 38 18 10a 10 36 42 36 28 14 24 20 26 40 12 40 22

PROCESS FOR PRODUCTION OF IRON

FIELD OF THE INVENTION

This invention relates to a process for the production of iron from a suitable source material by direct reduction. The process has particular application to the direct reduction of low-grade iron-containing source materials, such as iron sands, which presently are not used commercially for this purpose. However, the process also has application to higher grade source materials, such as iron ores usually subjected to conventional smelting operations. The process also is applicable to the smelting of ferrous scrap material.

BACKGROUND

Iron making using the conventional blast furnace has the disadvantage of requiring large-scale operation with massive capital input in order to maintain a low cost per ton of metal produced. The process needs lump coke as fuel and reductant. However, the production of coke is costly and subject to environmental problems resulting from the emission of gases such as hydrogen sulphide and because of the formation of air borne dust. The process also needs feed in lump form and current practice is to sinter feed with fluxes. The operation of a sinter plant also involves substantial monetary and environmental costs. In general iron making from the blast furnace process can only be considered for very large plants producing in excess of one million tons per annum of iron.

Electric furnace operations have been developed for smaller plants producing from two hundred thousand to one million tons per annum of iron. The electric furnace operates generally on pre-reduced feed and on scrap iron, and the amount of reduction of iron compounds which takes place is usually a minor component of the process. The process uses coke for this reduction, and thus has the same disadvantages as the blast furnace process. The process also uses electricity for heating purposes, and this is an expensive source of energy for high temperature smelting processes in most locations.

A number of direct smelting processes have been proposed and developed to pilot plant scale, involving the direct combustion of coal in an iron bath or in a slag bath under partial combustion reducing conditions with pure oxygen, or high levels of oxygen enrichment of the injected fuel. These processes have generally involved the use of partially reduced iron-ore as feed, and therefore entail the need for provision of pre-reduction facilities and operations as part of the process. This has necessarily involved greater operating complexity and greater capital costs.

The processes under development generally used bottom tuyeres for injection of fuel, air, and iron source into a metal bath. This entails expensive high pressure injection and involves severe conditions for the refractories in the vicinity of the tuyere. Some processes have used top jetting of fuel and air into the top surface of the bath, but this involves relatively poor heat transfer to the bath and relatively slow smelting reactions.

SUMMARY OF THE INVENTION

The present invention is directed to providing a process for the production of iron which is amenable to use of low-grade iron source material, and which enables more environmentally attractive operation than conventionally used processes.

DESCRIPTION OF PREFERRED EMBODIMENTS

The process of the invention comprises smelting iron-containing source material in a reactor containing a slag bath, wherein heating and reducing conditions are generated in at least one reducing region of the bath by injection of fuel/reductant and oxygen-containing gas by at least one top submerged lance; the source material is fed to the reactor together with additional reductant and with flux at or adjacent the at least one reducing region so as to be subjected to smelting reduction, using coal as the additional reductant; the rates of injection of oxygen and fuel/reductant are controlled to achieve required, sufficient reducing conditions by providing the injected gas with an oxygen content of from about 40% to about 100% sufficient for a degree of combustion of the fuel/reductant of from about 40% to about 50%; and wherein CO and $H_2$ generated by the smelting operation, as well as carbon dust carried out of the bath by combustion gases are subjected to post-combustion in the reactor.

The top submerged injection preferably provides strongly reducing conditions. The fuel and injected reductant may comprise coal in fine particulate form, fuel oil, natural gas, LPG or other suitable carbonaceous material. The fuel, in the case of fine coal, is injected by means of a carrier gas and that gas may comprise at least part of the oxygen required for fuel combustion. The carrier gas alternatively may comprise a mixture of inert gas such as nitrogen with air, oxygen-enriched air or solely oxygen, or it may simply comprise inert gas. Part of the oxygen required for combustion may be injected by flow through the lance which is separate from the flow of fuel/reductant, with mixing of the separate flows occuring only at the lower end of the lance and/or in the slag bath. Where at least part of the oxygen is injected by such separate flow, it may comprise oxygen alone, air, oxygen enriched air, or such gas mixed with an inert gas such as nitrogen.

The rates of injection of oxygen and fuel/reductant are controlled to achieve the required reducing conditions and, as indicated, those conditions most preferably are strongly reducing. Thus, the injected gas has an oxygen content of the gas of from about 40% to about 100%, and sufficient for a degree of combustion of the fuel/reductant of from about 40% to about 50%.

The additional coal reductant preferably is lump coal. It is fed to the bath with the iron-containing source material, most preferably at a rate of about 20 to 60 percent by weight of the source material. Suitable flux such as lime or silica, depending on the source material, also is fed with the source material. At least the additional coal reductant and source material is fed continuously during a smelting operation, with tapping of slag and iron metal being either continuous or batchwise.

A variety of forms of top submerged lances can be used. However, the smelting reduction process of the invention necessitates relatively high reactor temperatures, such as from about 1350° C. to about 1500° C. The or each lance therefore preferably is of a suitable alloy steel, such as stainless steel. The alloy steel preferably is of a high quality, being corrosion resistant and resistant to oxidation and dissolution in slags at high temperatures; with ASTM 321, 316 or other high chromium steels being suitable. Also, cooling of the lance generally is necessary, by supply of a coolant fluid thereto during the smelting operation, and the lance may be of the form disclosed in our International application PCT/AU90/00466 (WO91/05214) filed on 26

Sep., 1990. Most preferably, the lance is of the form disclosed in our co-pending Australian patent application PK8457 lodged on 20 Sep. 1991 (attorneys reference IRN228989). The disclosure of each of those references is incorporated herein and to be read as part of the disclosure of the present invention.

The process of the present invention is conducted with post-combustion of CO and $H_2$ generated by the smelting operation, as well as carbon dust carried out of the bath by the combustion gases. For this oxygen, or an oxygen-containing gas such as air or oxygen-enriched air, is blown into the reactor space above the slag bath. The post-combustion preferably is close to the bath surface, and most preferably adjacent to the or each reducing region, to achieve a high level of heat transfer to the slag bath. While the oxygen-containing gas for this can be supplied by at least one lance having its lower, discharge end above the bath surface, it is preferred that the gas is blown into the reactor space through a shroud pipe through which the top submerged lance for fuel/reductant injection extends, with the shroud pipe terminating above the bath surface. The shrouded lance of PCT/AU90/00466 and the lance with a shroud pipe disclosed in our co-pending Australian patent application PK8457 are suitable for this purpose.

Post-combustion preferably is conducted so as to achieve an oxidation degree in excess of 0.2, as determined by the ratio of ($CO_2$+$H_2O$) to (CO+$H_2$+$CO_2$+$H_2$). The oxidation degree preferably is not in excess of about 0.95, but can be up to 1.0. The oxidation degree is controlled so as to achieve a maximum level of heat transfer to the melt, consistent with subsequent use of the gases, while not re-oxidising the bath. Gases from the reactor may be used for general heating purposes, such as for steam production, but the economies of operation do not favour the use for pre-reduction of the source material.

The iron-containing feed material preferably is charged to the reactor along with a flux, such as burnt lime. Lump coal as further reductant can be charged with the source material. The source material can be in lumps or finely divided form but, particularly in the case of fine source material, it preferably is agglomerated, such as with the flux and/or lump coal, to prevent the source material being blown out with reactor flue gases. Agglomeration can be by use of addition of water at a pugging screw or other suitable device.

The source material and other material such as flux and further reductant most preferably are charged to or adjacent the or at least one reducing region resulting from top submerged injection via suitably positioned charging port means of the reactor, above the slag bath. However the source material and flux, when of a suitable fine particle size, can be charged to the reactor through the or each top submerged lance. In either case, the top submerged injection most preferably is such as to generate substantial turbulence in the reducing region, typically with substantial up-swelling of the bath surface.

The source material may comprise or include iron ore, as lump or fines. Alternatively, it may comprise or include pellets, pellet fines, iron sands, iron residues, scale, steel plant flue dust, ferrous scrap and high iron slag.

BRIEF DESCRIPTION OF THE DRAWINGS

In order that the invention can more readily be understood, reference is directed to the accompanying drawings, in which.

Figure 1:
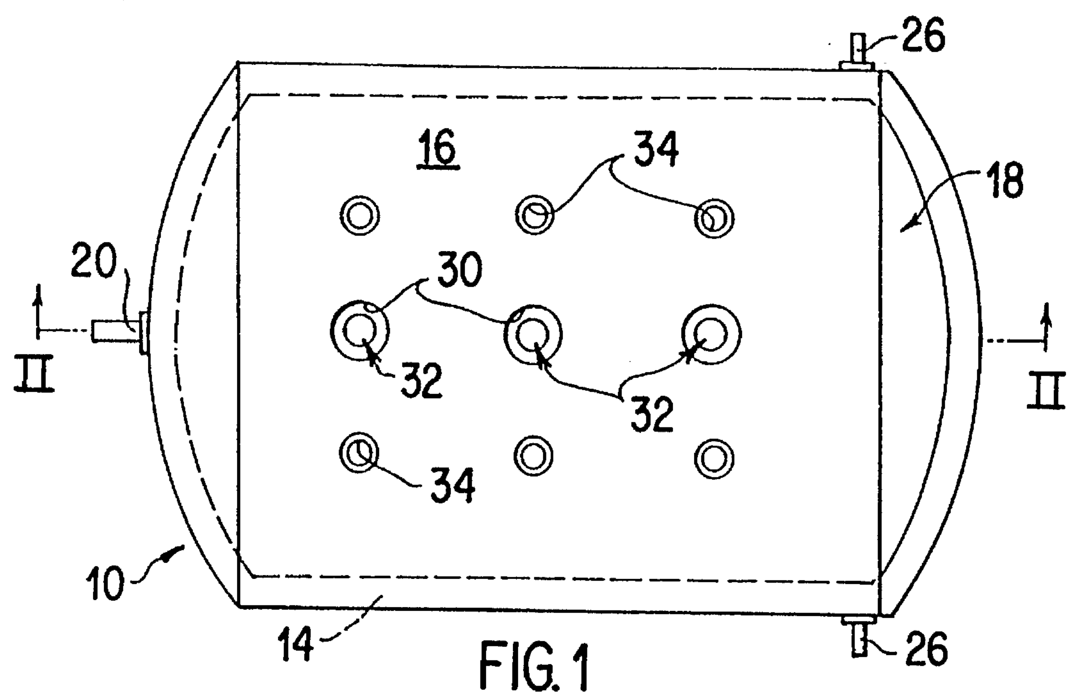
FIG. 1 is a top plan view of a reactor suitable for use in the process of the present invention.
Figure 2:
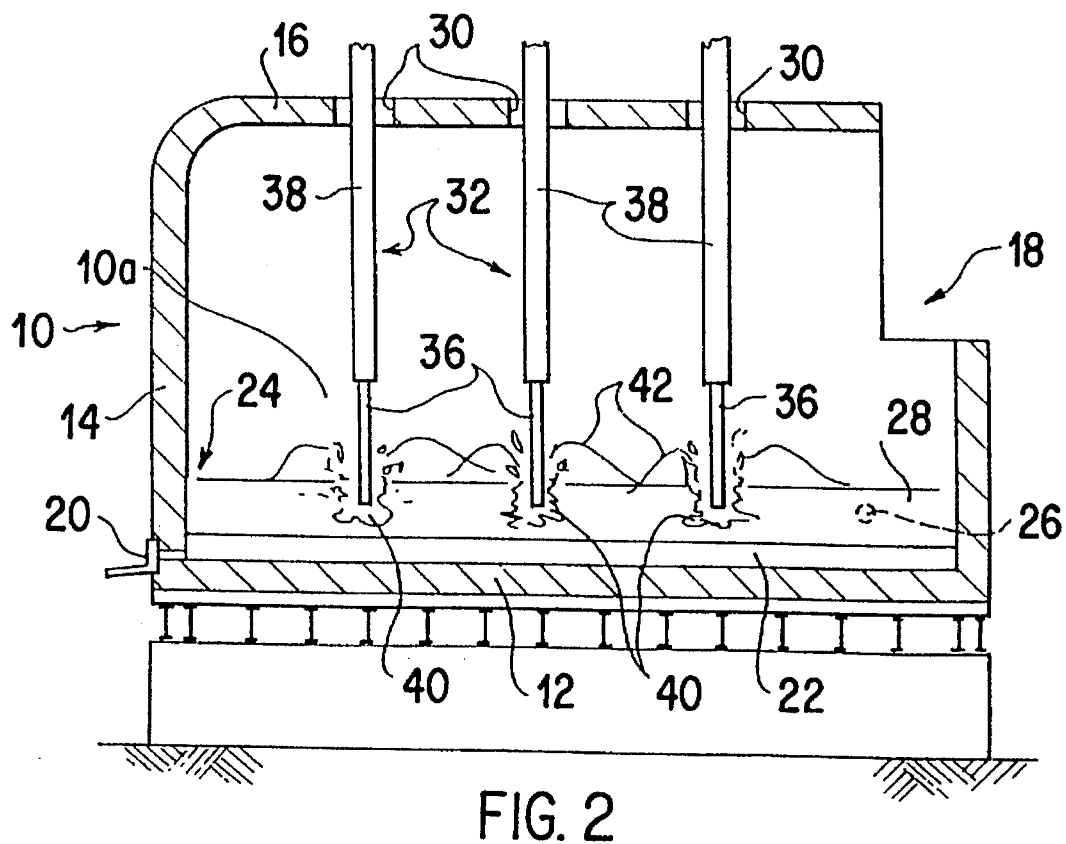
FIG. 2 is a longitudinal sectional view taken on line A—A of FIG. 1.

The reactor 10 of FIGS. 1 and 2 comprises substantially enclosed vessel having a base 12, peripheral side wall 14 and a top 16. At one end, a flue gas opening 18 is defined by an end portion of wall 14 and top 16. Reactor 10 preferably has a metal shell lined with suitable refractory material. At one end, reactor 10 has a tap hole 20 for tapping iron from iron layer 22 beneath the slag bath 24. At the other end, it has tap holes 26 for tapping slag from slag layer 28 from bath 24.

Generally centrally along top 16, reactor has a series of lance ports 30, in each of which is inserted a top submerged lance 32. To each side of ports 30, there are feed ports 34 for the charging of iron-containing source material, flux and, if required, reductant coal. Such charging preferably is conducted continuously with top submerged injection by lances 32.

Each lance 32 may be as disclosed in PCT/AU90/00466 or, more preferably, as disclosed in the above mentioned co-pending Australian patent application PK8457. The lances 32 each comprises a central conduit 36, most preferably comprising at least two substantially concentric pipes, and an outer shroud pipe 38 substantially concentric with conduit 36. At its upper end, each conduit 36 is connectable (by means not shown) to a supply of fuel/reductant, such as fine coal, and of oxygen-containing gas. The lower end of conduit 36 comprises a discharge tip or nozzle and, as shown, is submerged in slag layer 28 of bath 24. Injection of the fuel/reductant and oxygen-containing gas, and also carrier gas for the fuel/reductant if this is other than the oxygen-containing gas, is such as to generate reducing regions 40 at which upswellings 42 are formed in layer 28. The relative positioning of ports 30, 34 is such that feed through ports 34 is above upswellings 42.

At its upper end, each shroud pipe 38 is connectable (by means not shown) to a source of oxygen-containing gas. That gas passes down an annular passage between pipe 38 and its conduit 36. The lower end of each pipe 38 is spaced above the lower end of its conduit 36, such that the gas passed down such passages discharges therefrom into reactor space **10*a*, a short distance above bath 24, over each upswelling 42. After-burning or post-combustion, of CO and $H_2$ rising from bath 24, thus is able to occur such that substantial resultant heat energy is transferred to bath 24**.

Continuous feeding is used for all materials, while tapping of layers 22, 28 can be continuous on batchwise. The top submerged injection by lances 32 provides heat under non-oxidising conditions; while reduction is in part by lump coal, or fine coal with the non-containing source material, charged via ports 34.

Figure 3:
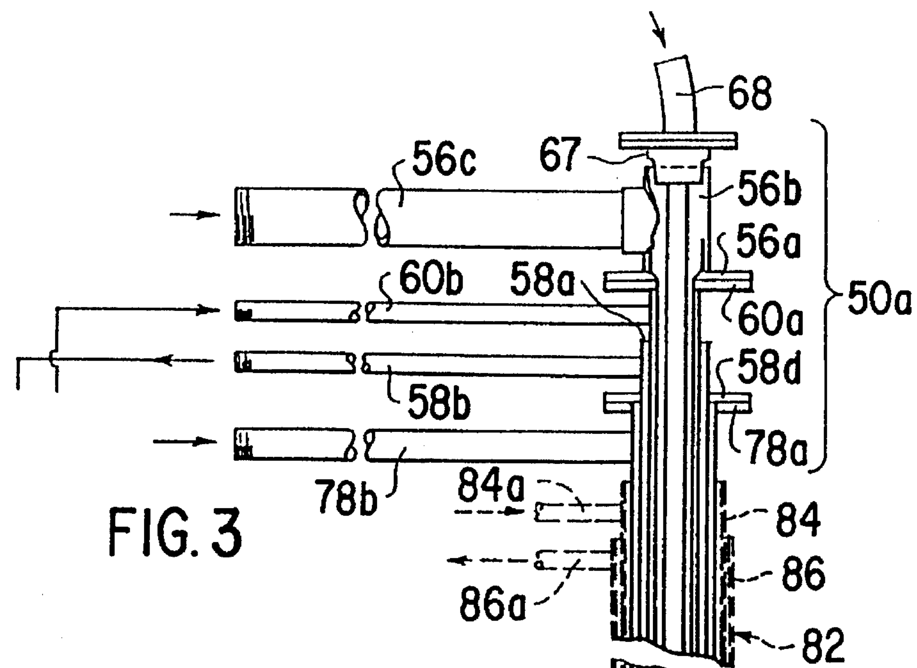
FIG. 3 is a sectional view of a preferred lance for use in the present invention.
Figure 4:
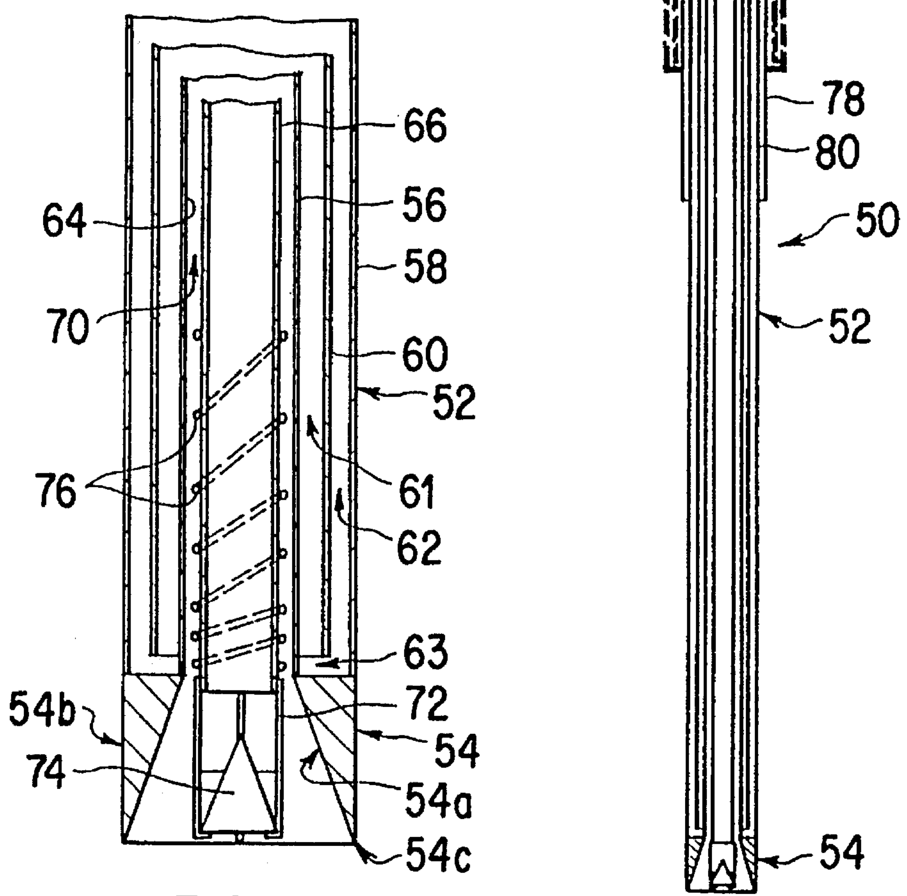
FIG. 4 is an enlarged sectional view of the lower end of the lance of FIG. 3.

The lance 50 of FIGS. 3 and 4 has a conduit 52 extending from upper end section **50*a* of lance 50 to a tip 54** at the lower discharge end.

Conduit 52 includes inner and outer concentric pipes 56,58 and a third pipe 60 disposed co-axially between pipes 56,58. Tip 54 is sealingly connected to the lower end circumference of each of pipes 56,58. However, the lower end of pipe 60 terminates above tip 54 such that the volume between pipes 56,58 is divided into inner and outer annular passages 61,62 which are in communication at 63, between the lower end of pipe 60 and tip 54.

In upper end section **50*a*, passage 61 is close by co-operating, interconnected flanges 56*a*,60*a* of pipes 56,60**.

Similarly, passage 62 is closed by an annular radial wall **58*a* of pipe 58 which is sealed around pipe 60. Pipe 60 has an inlet connector conduit 60*b*, by which conduit 52 is connectable to a source of pressurised coolant fluid, such as water, such that coolant fluid can be supplied to passage 61. Also, pipe 58 has an outlet connector conduit 58*b*, by which conduit 52 is connectable to a discharge line for discharge of coolant fluid from passage 62. The arrangement is such that coolant fluid, for cooling conduit 52, is able to be supplied via conduit 60*b* for flow downwardly through and around passage 61, and then upwardly and around passage 62, for discharge through conduit 58*b*. In such flow, the coolant fluid flows across the upper end of tip 54, at 63, to provide cooling of tip 54**.

Pipe 56 defines a bore 64 therethrough from the upper end of pipe 56 in section **50*a* to tip 54; while tip 54 provides a continuation of bore 64 to the lower end of lance 50. Concentrically within pipe 56, there is a fuel supply pipe 66 which extends from the upper end of lance 50 to a level in one example adjacent the top of tip 54. The upper end of pipe 66 is received into a collar 67 by which it is connected to a supply line 68. The latter is connectable to a source of fuel and carrier gas for the fuel, for injection of the fuel through lance 50 via pipe 66**.

Between pipes 56,66 there is an annular gas passage 70 through bore 64. The upper end of pipe 56 is enlarged at **56*b*, and provided with an inlet connector conduit 56*c*, by which passage 70 is connectable to a pressurised source of oxygen or oxygen containing gas, to enable injection of such gas through lance 50**.

Tip 54 has an inner peripheral surface **54*a* which, in addition to providing a continuation of bore 64, is frustoconical so as to taper downwardly and outwardly from the cross-section of bore 64 within pipe 56. The taper of surface 54*a* has a half cone angle of from 10° to 20°, for the reason indicated above. Surface 54*a* merges with external cylindrical surface 54*b* of tip 54, to define a sharp lower edge 54*c* of tip 54 at the outlet of lance 50**.

The lower end of pipe 66 may have a plurality of circumferentially spaced rods 72 which project axially within tip 54. Mounted on rods 72, within tip 54, there is a conical baffle 74 which increases in cross-section towards the lower end of lance 50. Baffle 74 has a half angle similar to that of surface **54*a* of tip 54, and causes the flow of fuel issuing from the pipe 66 to diverge outwardly into the flow of oxygen issuing from passage 70. Baffle 74 and also surface 54*a* of tip 54 minimize entry of slag into tip 54**.

Within the lower extent of passage 70, there may be a helical swirler 76 for imparting circumferential motion to oxygen issuing therefrom. Swirler 76 comprises a two-start helical baffle mounted on pipe 66, which decreases in pitch towards tip 54. Surface **54*a* of tip 54 and baffle 74 cause good mixing of the fuel and oxygen within tip 54 and this is further enhanced by the action of swirler 76. That mixing and the action of swirler 76 also result in good distribution of the fuel and oxygen within the slag in which they are injected by top submerged injection from lance 50**.

Concentrically disposed on the upper extent of conduit 52, there is a shroud pipe 78. A shroud passage 80 is defined between pipes 58,76, with passage 80 being closed at its upper end by respective flanges **58*d* and 78*a* of those pipes. Pipe 78 has an inlet conduit 78*b* communicating with passage 80 and connectable to a pressurized source of shroud gas, such as an oxygen-containing gas for post-combustion above a slag bath as detailed herein. The shroud gas is able to discharge from the open lower end of passage 80**, so as to discharge into furnace or reactor gases above the bath.

Around at least part of the length of pipe 78, there is a supplemental cooling system 82 although, as a more general consideration, this is optional. This comprises concentric pipes 84,86, each closed at their upper ends, with pipe 86 also closed at its lower end. Each pipe has a connector conduit **84*a*,86*a*, enabling the supply and discharge, respectively, of further coolant fluid, essentially as described in relation to circulation of such fluid within conduit 52. System 82 enhances overall cooling of lance 50 and, in particular, of shroud pipe 78**, against the effect of furnace or reactor gases and heat of post-combustion.

The lance 50, for top submerged injection, will be appreciated as employing an external coolant circulation system, preferably utilizing water as the coolant fluid. This provides a long operating life for the lance, obviating the need for frequent repairs. Lance 50 is used for injecting fuel, air and oxygen into a slag bath to provide heat, as well as vigorous stirring to achieve rapid and efficient reactions. It has particular advantages when used to inject coal as fuel and reductant with oxygen and air, to produce strongly reducing conditions at high temperatures, such as required to smelt and reduce iron from iron-containing materials.

The lance preferably is fabricated from stainless steel tubes or pipes, to prevent rusting and to provide resistance to high temperature oxidation. Tip 54 also preferably is of stainless steel while, as indicated, its internal cone half angle of 10° to 20° acts to prevent blockage by solidified slag. External water cooling maintains a low lance temperature, and in a system incorporating the lance, there preferably is a low pressure coolant fluid cut-off and lance raising mechanism.

The lance preferably has a minimum surface area, made permissible by an ability to maintain high velocities in gas and fuel flow. Typically, gas and fuel flows can range from Mach 0.05 to 1.0, preferably Mach 0.3 to 0.5. Similarly, high velocities of coolant flow enable minimum surface area for the lance, such as with coolant water flow of 1 to 5 m/sec.

Provision of shroud pipe 78 outside the conduit 52 enables air or other shroud gas to be injected above the bath. Such shroud gas provides cooling for the upper extent of lance 50. This shroud gas also can provide oxygen for above-bath reactions required for process reasons, in achieving sufficient post-combustion of carbon monoxide, hydrogen and carbon dust carried out of the bath during submerged injection. The position of shroud pipe 78 is optimized to allow maximum recovery of heat from such reactions to the bath, whilst avoiding re-oxidisation of the slag bath and metal products.

Provision of swirlers 76 in the oxygen/air duct enhance mixing of the injected materials before they enter the bath, and also provides stable discharge conditions for the injection of gas into the bath.

Provision of baffle 74 prevents slag from entering the tip and blocking flow.

The supplemental water cooled upper region, around the conduit 52, can be beneficial if the quantity of shroud gas discharged above the slag bath is not sufficiently large to prevent shroud pipe 78 from reaching temperatures which may cause oxidation or damage. The supplemental cooling preferably maintains the lower end of shroud pipe 78 at a temperature of from 400° to 800° C., depending on the material used.

A principal purpose of the invention is to allow injection of fuel, reductant, air and/or oxygen into a slag bath under conditions in which the lance is subjected to minimum wear and requires minimum maintenance. However, a further benefit where shroud pipe 78 is provided, is in enabling injection of post-combustion air or oxygen into the gas space above the bath, in suitable proximity to the point of injection, to ensure heat release from post-combustion efficiently heats the bath, whilst preventing re-oxidisation of the bath contents. This latter purpose has particular relevant to smelting and reducing iron-containing feed materials to produce metallic iron, in the form of pig iron or iron-containing less carbon than pig iron.

In order to further illustrate the invention, the following non-limiting Examples are provided.

EXAMPLE 1

A pilot plant operation was carried out in which iron sands material of analysis 46.6% Fe, 7.00% $TiO_2$, 13.4% $SiO_2$, 4.5% MgO, 4.0% CaO, 4.25% $Al_2O_3$, 1600 ppm Cr, 0.45% $V_2O_5$, and 0.29% $P_2O_5$ was fed into a top submerged lancing furnace through a feed port after mixing with burnt lime and lump coal, and wetting to 19.5% $H_2O$ in a pugging screw. A top submerged lance was fired with fine coal, oxygen and air to generate strongly reducing smelting conditions in the slag bath. Air was blown through a shroud pipe around the lance to provide post-combustion of CO, $H_2$ and carbon in the rising gases just above the bath. The feed conditions were as follows:

| | |
|---|---|
| Feeding rate of iron sands | 65 kg/hr |
| of lump coal | 30 kg/hr |
| of lime | 6.5 kg/hr |
| Injection rate of fine coal | 150 kg/hr |
| oxygen | 85 $Nm^3$/hr |
| carrier air | 50 to 65 $Nm^3$/hr |
| shroud air | 200 $Nm^3$/hr |

The smelting temperature was in the range 1400° C. to 1450° C. Metal and slag were tapped off during smelting. After a total time of 19.6 hours the furnace contents were tapped completely.

A total of 937.4 kg of iron sands were fed during firing at a level of combustion at the lance tip of 43%. The oxygen enrichment level in injected gases was 60%. The degree of post-combustion with shroud air was 25%.

Iron of analysis 94.8% fe, 2.74% C, 0.11% S, 0.05% V, 0.05% P was produced, with an iron recovery of 87%. The level of iron left in the slag tapped off was 4%.

EXAMPLE 2

Iron sands material of the same composition of Example 1 was smelted in a furnace as shown in FIGS. 1 and 2 at a total smelting rate of 80 tph. Lump coal and burnt lime were fed into the bath at rates of 17300 kg/hr and 8400 kg/hr respectively together with the iron sands and 15% agglomeration water.

The three lances were used to inject a total of 29522 kg/hr fine coal, 15028 $Nm^3$/hr oxygen and 15413 $Nm^3$/hr combustion air into the bath, representing 60% oxygen enrichment and 45% combustion of fine coal. The shrouds on the lances were used to supply 248460 $Nm^3$/hr post-combustion air, which provided 30% recovery of post-combustion heat to the bath.

The flue gases contained substantial heat and, if all had been passed through a waste heat boiler, it would have generated sufficient steam to produce nearly 40 MW of power. The smelting plant consumed 10 MW of power mostly for oxygen generation, thus providing an excess of power if all waste heat were to be utilized. Alternatively a waste heat boiler and turbine power plant could be sized to generate the oxygen required for the smelter and run the electrical facilities of the plant. The rest of the gases were passed to atmosphere after removal of dust.

The plant produced 40.7 tph of iron of analysis 95.8% Fe, 4.0% C, and 32.2 tph of slag of composition 5% Fe, 29.2% CaO, 15.2% $SiO_2$, 9.1% MgO was produced and granulated for disposal. The recovery of iron in the process was 96.1%.

Fine coal, carrier air and oxygen were injected into a bath of liquid slag through the lances. This mixture had an oxygen enrichment level of 60%, and degree of combustion of 45%. This injection provided the energy needs for submerged smelting, as well as bath tubulence and reducing conditions in the bath. Air was injected through the shroud pipes of the lance to fully burn the CO, $H_2$ and carbon being carried off the bath by rising gases. This post-combustion provided energy above the bath in a position where significant recovery to the bath occurs. Iron-containing feed in lump or fine form was mixed with burnt lime flux, lump coal reductant and agglomeration water, as needed, and fed through feed ports as shown in FIGS. 1 and 2. Preferably, dust from the furnace is recycled, with added burnt lime.

The iron and a low-iron slag produced were tapped off from the respective tap holes at opposite ends of the furnace. The metal was suitable to be processed through to steel through separate plants using known methods or sold as pig iron, whilst the slag was able to be granulated for use or discard.

The flue gases generated in the furnace had a substantial energy content, sufficient to generate 3 to 4 times the power requirements of the plant if passed through a waste heat boiler with associated steam turbine power plant.

Finally, it is to be understood that various alterations, modifications and/or additions may be introduced into the constructions and arrangements of parts previously described without departing from the spirit or ambit of the invention.

What is claimed is:

1. A process for producing iron metal and slag by smelting iron-containing source material in a reactor containing a molten bath comprising slag or having a slag layer, wherein the process comprises the steps of:

(a) injecting fuel/reductant and oxygen-containing gas into the slag, by at least one top-submerged lance, to generate heating and reducing conditions in at least one reducing region in the bath;

(b) feeding the source material to the reactor, together with additional reductant comprising coal and with flux, at or adjacent to the at least one reducing region, whereby the source material is subjected to smelting reduction which generates combustion gases comprising CO and $H_2$;

(c) controlling the rates of injection of the oxygen-containing gas and fuel/reductant by said at least one lance to achieve required, sufficient reducing conditions; and (d) post-combusting, in the reactor above the bath, the combustion gases generated by the smelting;

wherein the controlling of step (c) is conducted to result in the injected oxygen-containing gas having an oxygen content of from about 40 volume % to about 100 volume % and sufficient for a degree of combustion of from about 40 weight % to about 50 weight % of the fuel/reductant injected by the at least one lance.

2. The process of claim 1, wherein the top submerged injection provides strongly reducing conditions.

3. The process of claim 1, wherein the injected fuel/reductant is selected from the group consisting of coal in fine particulate form, fuel oil, natural gas, LPG and mixtures thereof.

4. The process of claim 3, wherein the fuel is fine coal injected by means of a carrier gas.

5. The process of claim 4, wherein the carrier gas comprises at least part of the oxygen required for fuel combustion.

6. The process of claim 4, wherein the carrier gas is selected from the group consisting of a mixture of inert gas with air, oxygen-enriched air, oxygen, and inert gas.

7. The process of claim 6, wherein the carrier gas is an inert gas with air or inert gas, and the inert gas is nitrogen.

8. The process of claim 1, wherein part of the oxygen required for combustion is injected by flow through the lance which is separate from the flow of fuel/reductant, with mixing of the separate flows occurring at the lower end of the lance, in the slag bath adjacent to the lower end of the lance, or a combination thereof.

9. The process of claim 8, wherein said part of the oxygen injected by said separate flow is selected from the group consisting of oxygen alone, air and oxygen enriched air, and is optionally mixed with an inert gas.

10. The process of claim 1, wherein the additional coal reductant is lump coal.

11. The process of claim 10, wherein the lump coal is fed to the bath with the iron-containing source material.

12. The process of claim 11, wherein the lump coal is fed at a rate of about 20 to 60 percent by weight of the source material.

13. The process of claim 1, wherein flux, selected from the group consisting of lime and silica, is fed with the source material.

14. The process of claim 1, wherein at least the additional coal reductant and source material is fed continuously during a smelting operation, with tapping of slag and iron metal being continuous.

15. The process of claim 1, wherein at least the additional coal reductant and source material is fed continuously during a smelting operation, with tapping of slag and iron metal being batchwise.

16. The process of claim 1, wherein the smelting reduction is conducted at a reactor temperature of from about 1350° C. to about 1500° C., with each lance being of a suitable alloy steel.

17. The process of claim 16, wherein the or each lance is cooled by a supply of a coolant fluid thereto during the smelting reduction.

18. The process of claim 1, wherein post-combustion is effected by oxygen-containing gas blown into the reactor space above the slag bath.

19. The process of claim 18, wherein the post-combustion is effected close to the bath surface to achieve a high level of heat transfer to the slag bath.

20. The process of claim 1, wherein oxygen-containing gas for post-combustion is supplied by at least one lance having its lower, discharge end above the bath surface.

21. The process of claim 1, wherein oxygen-containing gas for post-combustion is blown into the reactor space through a shroud pipe through which the top submerged lance for fuel/reductant injection extends, with the shroud pipe terminating above the bath surface.

22. The process of claim 1, wherein post-combustion produces gases comprising $CO_2$, $H_2O$, $H_2$ or CO, said post-combustion being conducted so as to achieve an oxidation degree in excess of 0.2, as determined by a calculated ratio of $(CO_2+H_2O)$ to $(CO+H_2+CO_2+H_2)$ based on gases present in the reactor as a result of post-combustion.

23. The process of claim 22, wherein the oxidation degree is not in excess of about 0.95.

24. The process of claim 22, wherein the oxidation degree is controlled so as to achieve a maximum level of heat transfer to the melt, while not re-oxidising the bath.

25. The process of claim 1, wherein the iron-containing source material is charged to the reactor along with a flux, comprising burnt lime and lump coal as further reductant, with the source material in lumps.

26. The process of claim 1, wherein the source material is agglomerated with flux and/or lump coal, to prevent the source material being blown out with reactor flue gases.

27. The process of claim 1, wherein the source material, flux and further reductant are charged to or adjacent the or at least one reducing region resulting from top submerged injection via suitably positioned charging port means of the reactor, above the slag bath.

28. The process of claim 1, wherein the source material and flux, of a suitable fine particle size, are charged to the reactor through the or each top submerged lance.

29. The process of claim 1, wherein the top submerged injection generates substantial turbulence in the reducing region, with substantial up-swelling of the bath surface.

30. The process of claim 1, wherein the source material is at least one member selected from the group consisting of iron ore lumps, iron ore fines, iron ore pellets, iron ore pellet fines, iron sands, iron residues, iron scale, steel plant flue dust, high iron slag, and mixtures thereof.

31. The process of claim 1, wherein said smelting generates carbon dust that is entrained in said combustion gases, said carbon dust being combusted in said post-combusting step.

* * * * *